US011698140B2

(12) United States Patent
Osmun et al.

(10) Patent No.: US 11,698,140 B2
(45) Date of Patent: Jul. 11, 2023

(54) BALL VALVE WITH MULTI-ANGULAR SEALING FOR COOLANT CONTROL REGULATOR

(71) Applicant: Illinois Tool Works Inc., Glenview, IL (US)

(72) Inventors: Nathan Osmun, Edgerton, OH (US); Joseph Davis, Archbold, OH (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 88 days.

(21) Appl. No.: 17/321,623

(22) Filed: May 17, 2021

(65) Prior Publication Data

US 2021/0381422 A1   Dec. 9, 2021

Related U.S. Application Data

(60) Provisional application No. 63/035,233, filed on Jun. 5, 2020.

(51) Int. Cl.
*F16K 11/087* (2006.01)
*F16K 5/06* (2006.01)
*F01P 7/14* (2006.01)

(52) U.S. Cl.
CPC ........ *F16K 11/0873* (2013.01); *F16K 5/0605* (2013.01); *F01P 7/14* (2013.01); *F01P 2007/146* (2013.01)

(58) Field of Classification Search
CPC ........ F01P 2007/146; F01P 7/14; F01P 7/165; F16K 5/0605; F16K 5/06; F16K 5/0652; F16K 5/0647; F16K 11/087; F16K 11/0873; F16K 11/14; F16K 11/10
See application file for complete search history.

(56) References Cited

U.S. PATENT DOCUMENTS

| 4,289,038 | A |   | 9/1981  | Hore      |              |
|-----------|---|---|---------|-----------|--------------|
| 4,655,252 | A | * | 4/1987  | Krumhansl | F16K 11/0853 |
|           |   |   |         |           | 251/59       |
| 4,774,977 | A | * | 10/1988 | Cohen     | F16K 27/10   |
|           |   |   |         |           | 137/271      |

(Continued)

FOREIGN PATENT DOCUMENTS

| DE | 102018009680 A1 | * | 6/2020  |
|----|-----------------|---|---------|
| EP | 2943704 A1      |   | 11/2015 |

(Continued)

OTHER PUBLICATIONS

International Search Report and Written Opinion from PCT/US2022/014051, dated May 24, 2022.

*Primary Examiner* — David Colon-Morales
(74) *Attorney, Agent, or Firm* — Quarles & Brady LLP

(57) ABSTRACT

A coolant control regulator assembly that comprises a plurality of modular housings, an actuator, and a plurality of ball valves. The actuator is operatively connected to at least one of the plurality of modular housings. Each of the modular housings comprises an internal cavity, at least one inlet port, and at least one outlet port. Further, each of the internal cavities includes one of the plurality of ball valves positioned therein. At least one of the plurality of ball valves comprises a plurality of apertures that are configured to align with the at least one inlet port and the at least one outlet port in certain rotational positions.

20 Claims, 18 Drawing Sheets

(56) References Cited

U.S. PATENT DOCUMENTS

| | | | |
|---|---|---|---|
| 5,167,254 A * | 12/1992 | Walter | F16K 11/0833 |
| | | | 137/862 |
| 6,681,805 B2 | 1/2004 | McLane et al. | |
| 7,163,194 B2 * | 1/2007 | Pervaiz | F16K 5/0478 |
| | | | 251/63.4 |
| 7,963,455 B2 | 6/2011 | Heldberg et al. | |
| 8,435,148 B2 | 5/2013 | Moorman | |
| 8,500,600 B2 | 8/2013 | Moorman | |
| 9,032,915 B2 | 5/2015 | Tobergte et al. | |
| 9,212,751 B2 | 12/2015 | McLane et al. | |
| 9,500,299 B2 * | 11/2016 | Morein | F16K 11/0876 |
| 9,695,734 B2 * | 7/2017 | Carns | F16K 5/0605 |
| 9,827,824 B2 | 11/2017 | Enomoto et al. | |
| 9,932,882 B2 * | 4/2018 | Imasaka | F01P 7/14 |
| 9,951,878 B2 | 4/2018 | Heldberg | |
| 10,119,451 B2 | 11/2018 | Seeger | |
| 10,125,878 B2 * | 11/2018 | Bartonek | F16K 11/166 |
| 10,240,682 B2 * | 3/2019 | Lou | F01P 7/14 |
| 10,280,829 B2 | 5/2019 | Shen et al. | |
| 10,344,877 B2 | 7/2019 | Roche et al. | |
| 10,544,725 B2 * | 1/2020 | Schaefer | F16K 11/0876 |
| 10,665,908 B2 | 5/2020 | Krull et al. | |
| 10,808,863 B2 * | 10/2020 | Bugeja | F16K 11/165 |
| 10,975,975 B2 * | 4/2021 | Sato | F16K 27/04 |
| 11,280,415 B2 * | 3/2022 | Hashimoto | F16K 11/0873 |
| 2004/0026175 A1 | 2/2004 | Oh et al. | |
| 2006/0118066 A1 | 6/2006 | Martins | |
| 2015/0000327 A1 | 1/2015 | Kakehashi et al. | |
| 2015/0075453 A1 * | 3/2015 | Oikawa | F16K 11/0853 |
| | | | 123/41.1 |
| 2016/0273671 A1 | 9/2016 | Chang et al. | |
| 2018/0263180 A1 | 9/2018 | Schlipf et al. | |
| 2019/0070924 A1 | 3/2019 | Mancini et al. | |
| 2019/0368621 A1 | 12/2019 | Marchand et al. | |
| 2020/0132204 A1 | 4/2020 | Krost et al. | |
| 2020/0171914 A1 | 6/2020 | Han et al. | |
| 2020/0253110 A1 | 8/2020 | Schlipf et al. | |
| 2020/0253111 A1 | 8/2020 | Schlipf et al. | |
| 2020/0393053 A1 * | 12/2020 | Dragojlov | F16K 11/165 |
| 2021/0047959 A1 * | 2/2021 | Jafari | F16K 5/12 |

FOREIGN PATENT DOCUMENTS

| | | |
|---|---|---|
| EP | 3073161 A1 | 9/2016 |
| GB | 2328492 A | 2/1999 |
| WO | 2016045895 A1 | 3/2016 |
| WO | 2016194502 A1 | 12/2016 |
| WO | 2017058616 A1 | 4/2017 |
| WO | 2019011617 A1 | 1/2019 |
| WO | 2020018340 A1 | 1/2020 |
| WO | 2020186589 A1 | 9/2020 |

* cited by examiner

BALL VALVE WITH MULTI-ANGULAR SEALING FOR COOLANT CONTROL REGULATOR

CROSS REFERENCE TO RELATED APPLICATIONS

The present application claims the benefit of U.S. Provisional Application Ser. No. 63/035,233 filed on Jun. 5, 2020, which is hereby incorporated by reference in its entirety.

FIELD OF THE DISCLOSURE

The present disclosure relates generally to a coolant control regulator and, more particularly, to a multi-angular seal on a spherical ball valve.

BACKGROUND

Coolant control regulators or valves are used in coolant circuits of vehicles, such as cars or trucks, for cooling or heating an internal combustion engine or battery. It is known in the art to arrange a coolant control valve to regulate the coolant through the vehicle.

Many known coolant control regulators include a ball valve with a singular seal that only allows for a single open or closed section on the ball valve at a specific rotation. As such, the ball valve is restricted to a limited number of sealing/flow states within a 360° rotation zone. Therefore, a need exists for a coolant control valve with additional sealing or flow states that allow for additional flow control over conventional ball valve designs.

SUMMARY

In one aspect, a coolant control regulator assembly comprises a plurality of modular housings, an actuator, and a plurality of ball valves. The actuator is operatively connected to at least one of the plurality of modular housings. Each of the modular housings comprises an internal cavity, at least one inlet port, and at least one outlet port. Further, each of the internal cavities includes one of the plurality of ball valves positioned therein. At least one of the plurality of ball valves comprises a plurality of apertures that are configured to align with the at least one inlet port and the at least one outlet port in certain rotational positions.

In another aspect, a coolant control regulator assembly comprises a plurality of modular housings. Each of the modular housings comprises an internal cavity, at least one inlet port, and at least one outlet port. The coolant control regulator assembly further comprises a plurality of ball valves. Each of the internal cavities includes one of the plurality of ball valves positioned therein. At least one of the plurality of ball valves comprises a plurality of apertures that are configured to align with the at least one inlet port and the at least one outlet port in certain rotational positions. At least one of the plurality of ball valves comprises more than two rotational positions to allow fluid to pass through the ball valve.

In a further aspect, a ball valve for a coolant control regulator assembly comprises a body that is ring-shaped and defines a rounded wall. The body extends from a first lateral end to a second lateral end. The ball valve further comprises a plurality of arms that extend radially inward from the rounded wall, and a rod that connects the plurality of arms together. The rounded wall comprises a plurality of apertures therethrough.

BRIEF DESCRIPTION OF THE DRAWINGS

The invention will be better understood and features, aspects, and advantages other than those set forth above will become apparent when consideration is given to the following detailed description thereof. Such detailed description makes reference to the following drawings.

DETAILED DESCRIPTION OF THE DRAWINGS

Figure 1:
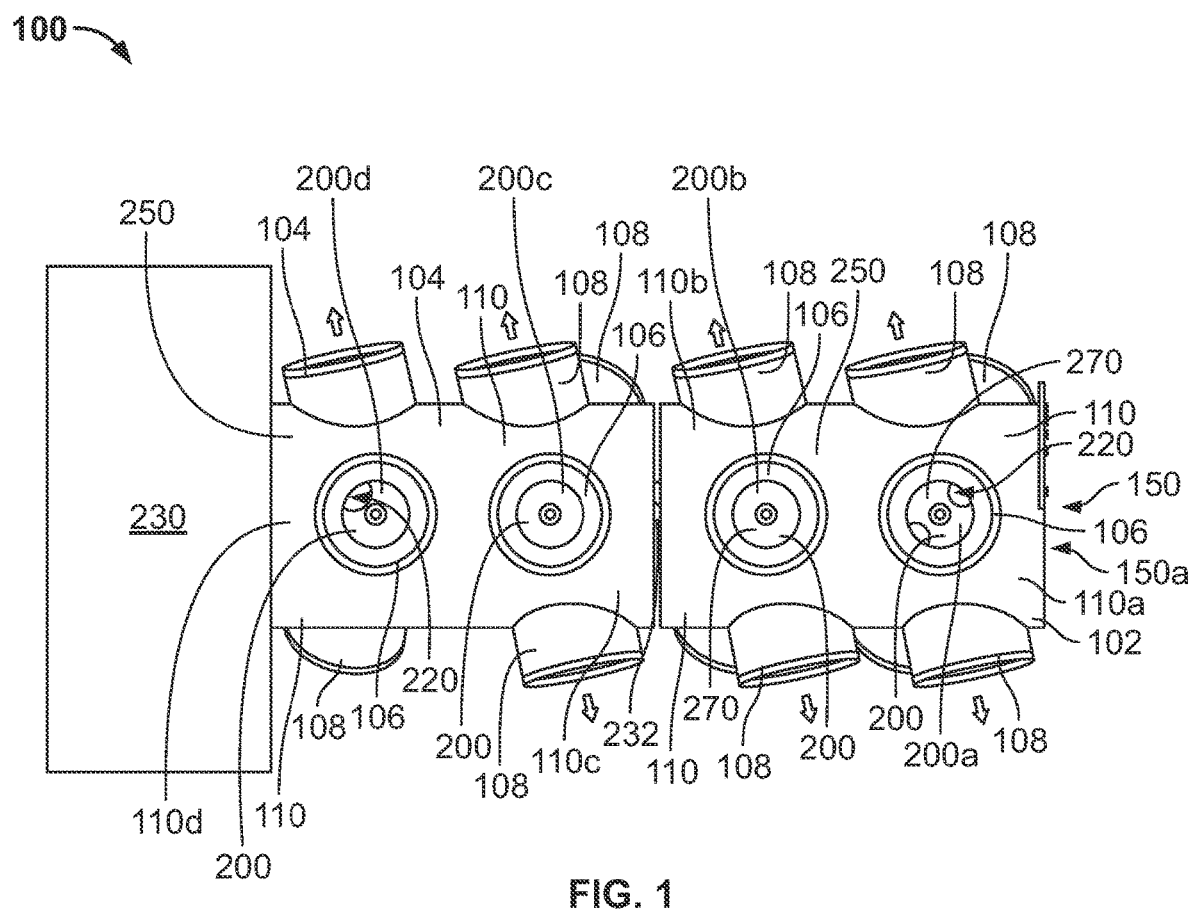
FIG. 1 is a side view of a coolant control ball valve assembly, according to one embodiment.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Throughout the disclosure, the terms "about" and "approximately" mean plus or minus 5% of the number that each term precedes.

Embodiments of the present disclosure provide for a coolant control regulator or coolant control ball valve assembly comprising a ball valve with a plurality of sealing or flow possibilities. Specifically, the ball valve comprises multiple sealing and flow openings/apertures that can be shared on the same spherical ball valve surface. As a result of the ball valve, the coolant control regulator can increase the cooling/heating mode capacity and control multiple control circuits.

Figure 2:
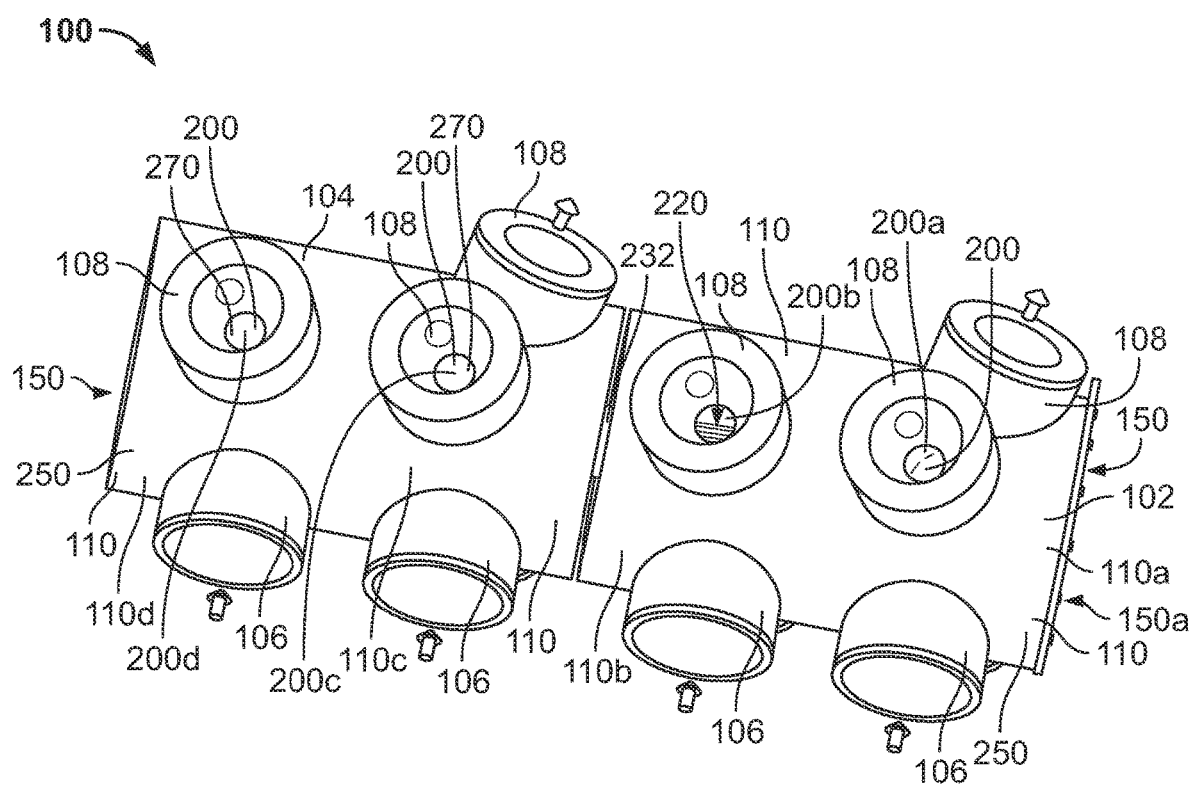
FIG. 2 is an isometric view of the coolant control ball valve assembly of FIG. 1.
Figure 3:
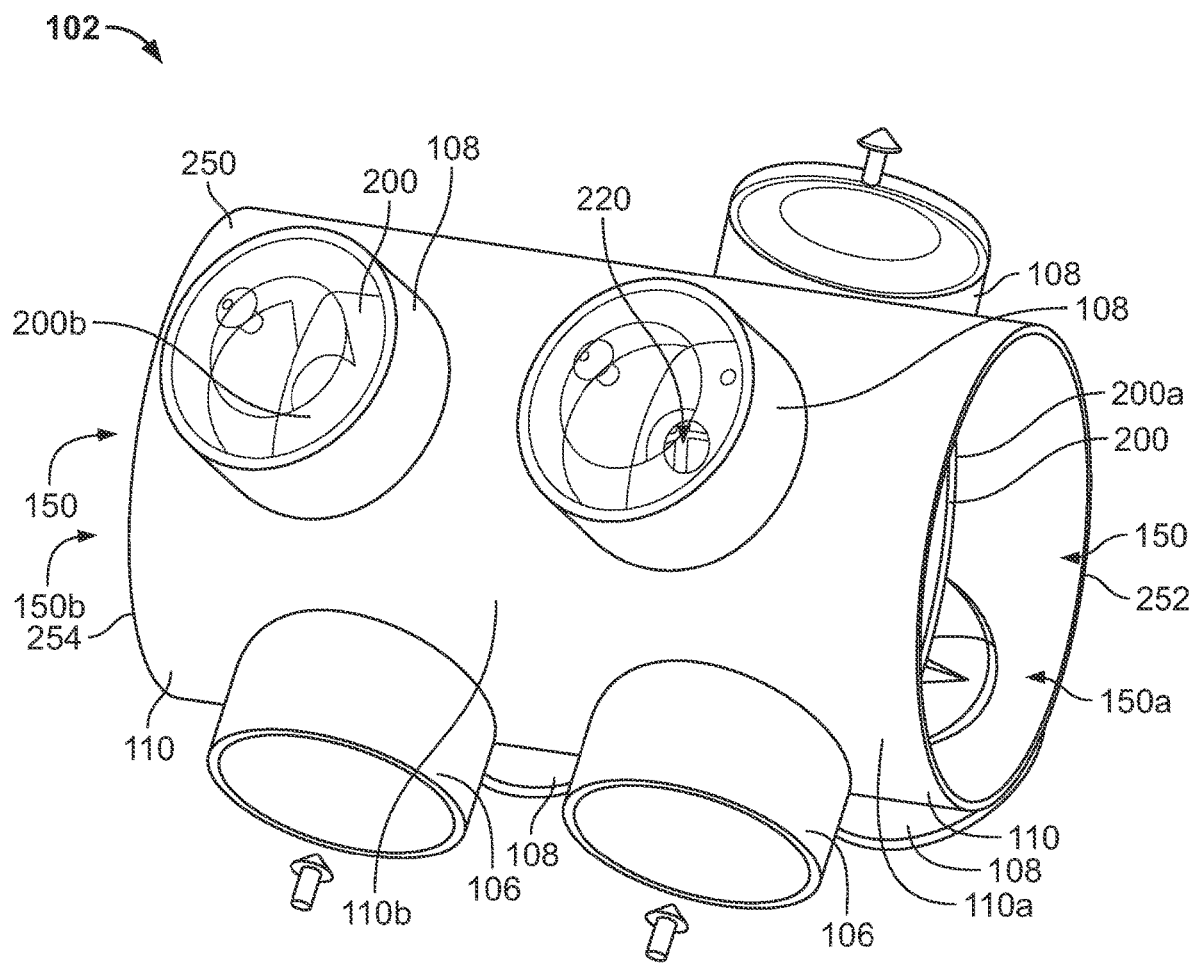
FIG. 3 is a isometric view of a first sleeve of the coolant control ball valve assembly of FIG. 1.
Figure 4:
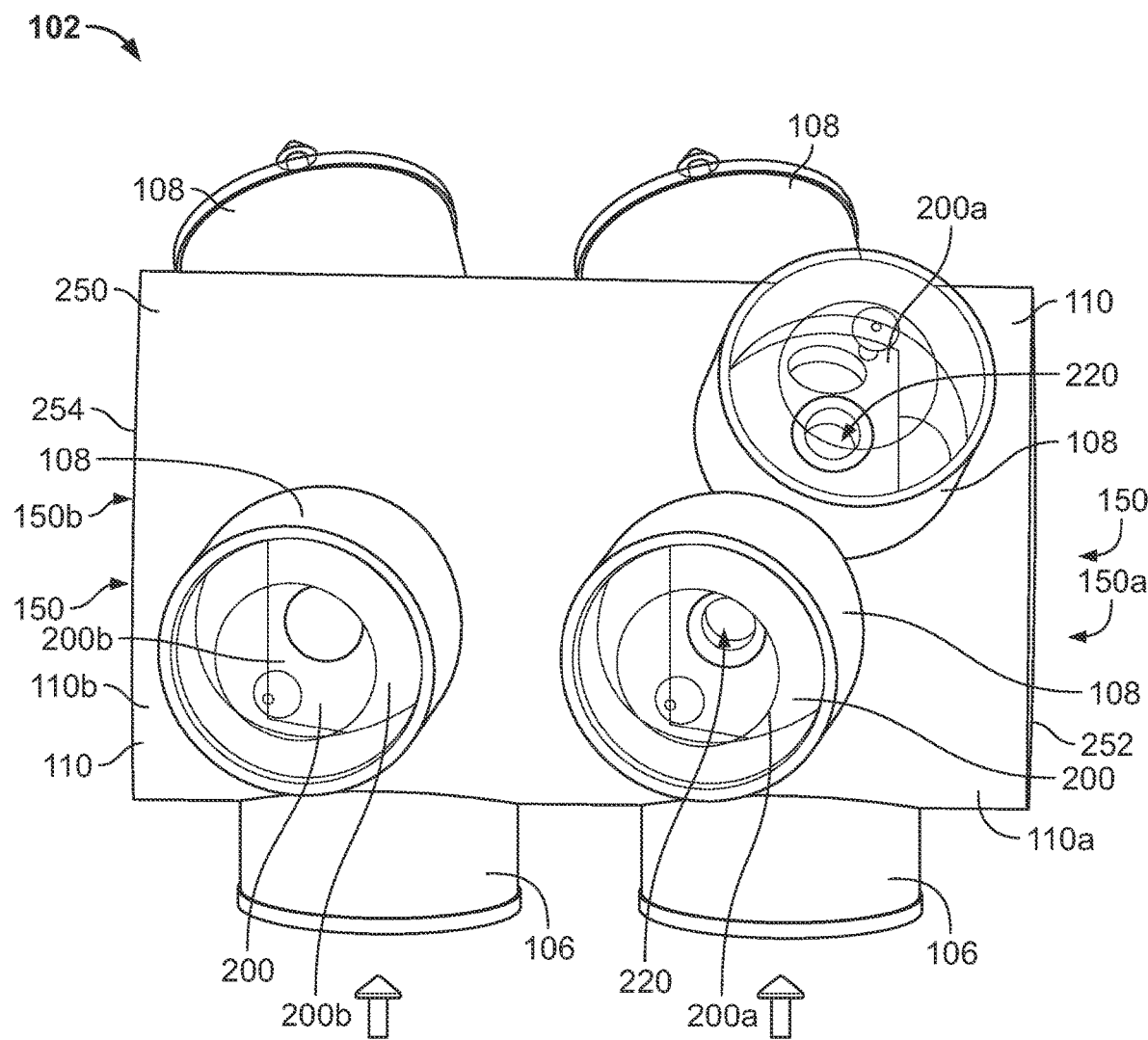
FIG. 4 is a side view of the first sleeve of FIG. 3.
Figure 5:
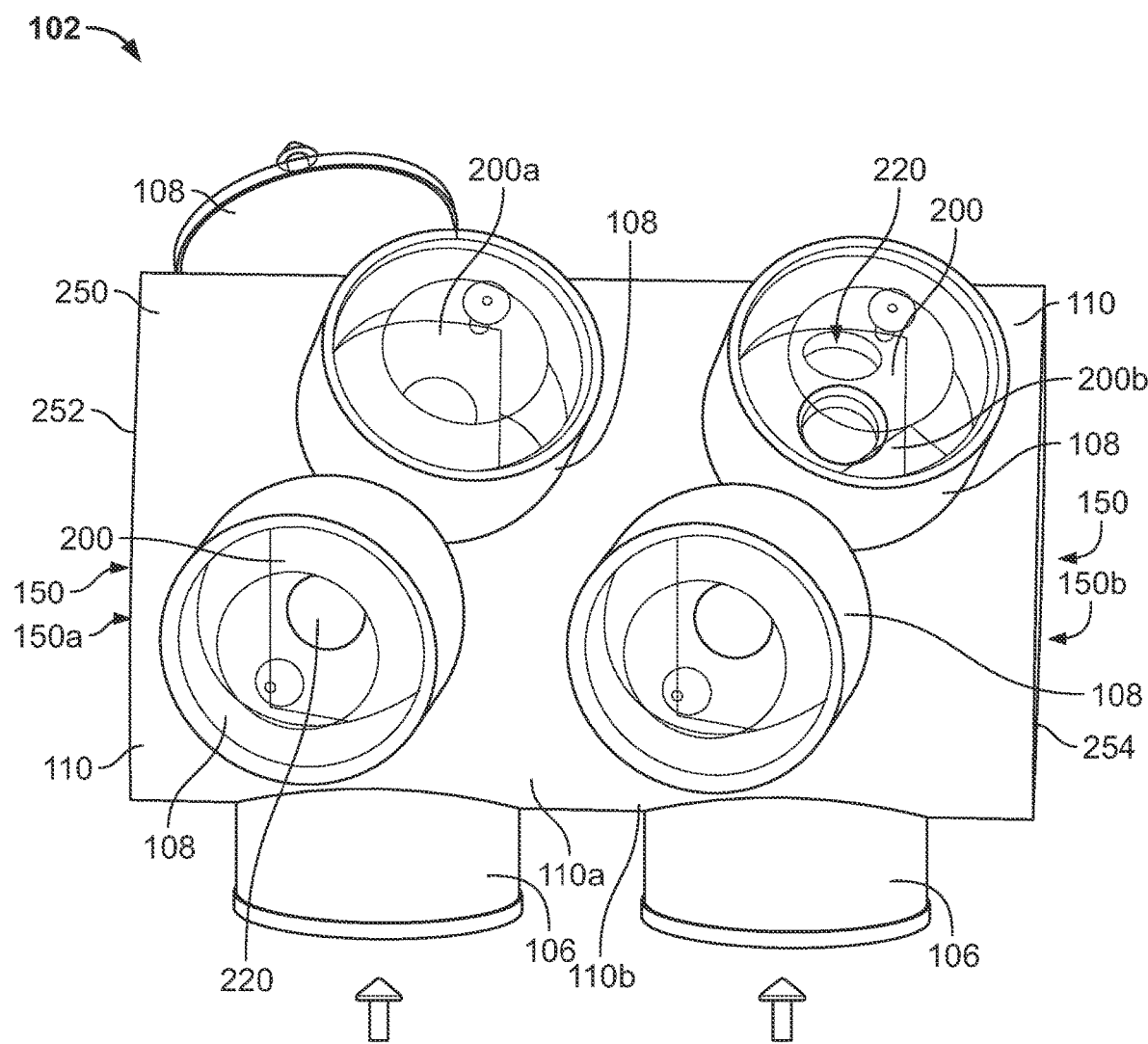
FIG. 5 is another side view of the first sleeve of FIG. 3.

FIGS. 1-18 illustrate a coolant control ball valve assembly or coolant control regulator assembly 100 in accordance with the present disclosure. Referring to FIGS. 1 and 2, a side view and an isometric view of the control valve assembly 100 are shown, respectively. The control valve assembly 100 is provided for a cooling system of a vehicle, for example a passenger motor vehicle, an autonomous vehicle, or a truck. In some embodiments, the cooling system may be part of an engine, such as an internal combustion engine, of the vehicle, or the cooling system may be part of an electric vehicle. In one embodiment, the control valve assembly 100 may be arranged in an auxiliary circuit of such a cooling system. As noted herein, it is contemplated that the control valve assembly 100 may be used in any type of engine or vehicle system. For example, the control valve assembly 100 may be part of a hybrid motor vehicle or a fully electric motor vehicle, as discussed above. Further, the control valve assembly 100 may be part of an auxiliary circuit coolant control system, such as in line with the transmission or the vehicle cabin heating system. It is contemplated that the control valve assembly 100 may be connected to any type or number of fluid circuit systems in the vehicle to cool and/or heat any portion of the vehicle.

Referring still to FIGS. 1 and 2, the control valve assembly 100 comprises a first sleeve 102 and a second sleeve 104. The first and second sleeves 102, 104 are connected to each other in any known manner. Further, the first and second sleeves 102, 104 include a plurality of inlet ports 106 and a plurality of outlet ports 108 positioned circumferentially around the sleeves 102, 104. The inlet and outlet ports 106, 108 are generally cylindrical in shape. As noted herein, the inlet ports 106 are illustrated with arrows pointing toward the control valve assembly 100, and the outlet ports 108 are illustrated with arrows pointing away from the control valve assembly 100. In alternative embodiments, the control valve assembly 100 may include more sleeves 102, 104 than illustrated, or the control valve assembly 100 may include fewer sleeves 102, 104 than illustrated. For example, the control valve assembly 100 may include one sleeve, or two sleeves, or three sleeves, or four sleeves, or five sleeves, or any number of sleeves. Further, the control valve assembly 100 may include any number of the inlet ports 106 and the outlet ports 108.

In some embodiments, each sleeve 102, 104 may include one inlet port 106, or two inlet ports 106, or three inlet ports 106, or four inlet ports 106, or five inlet ports 106, or six inlet ports 106, or seven inlet ports 106, or eight inlet ports 106, or nine inlet ports, or any number of inlet ports 106. Further, each sleeve 102, 104 may include one outlet port 108, or two outlet ports 108, or three outlet ports 108, or four outlet ports 108, or five outlet ports 108, or six outlet ports 108, or seven outlet ports 108, or eight outlet ports 108, or nine outlet ports 108, or any number of outlet ports 108. Further, the number of inlet ports 106 may be the same as the number of outlet ports 108 on each sleeve 102, 104. Alternatively, the number of inlet ports 106 may be different than the number of outlet ports 108 on each sleeve 102, 104. Further, the number of inlet ports 106 may be greater than the number of outlet ports 108. Alternatively, the number of outlet ports 108 may be greater than the number of inlet ports 106. Further, the number of inlet and outlet ports 106, 108 may be the same across the sleeves 102, 104. Alternatively, the number of inlet and outlet ports 106, 108 may be different across the sleeves 102, 104.

The number of inlet ports 106 and outlet ports 108 included in the control valve assembly 100 may vary depending on the number of cooling and heating systems in a vehicle. The number of inlet ports 106 and the number of outlet ports 108 used in combination may vary to maximize the thermodynamic efficiency of a given vehicle.

Still referring to FIGS. 1 and 2, the first and second sleeves 102, 104 comprise a plurality of modular housings 110. In particular, the first sleeve 102 comprises a first modular housing 110a and a second modular housing 110b. Additionally, the second sleeve 104 comprises a third modular housing 110c and a fourth modular housing 110d. As such, both the first sleeve 102 and the second sleeve 104 comprise two modular housings 110. However, in alternative embodiments, the first and second sleeves 102, 104 may comprise any number of modular housings 110a, 110b, 110c, 110d therein. For example, in some embodiments, the control valve assembly 100 may include a single sleeve that includes one modular housing 110a, 110b, 110c, 110d, or two modular housings 110a, 110b, 110c, 110d, or three modular housing 110a, 110b, 110c, 110d, or four modular housings 110a, 110b, 110c, 110d. Alternatively, in some embodiments, the control valve assembly 100 may include three sleeves (not shown) that include a plurality of modular housings 110a, 110b, 110c, 110d, or four sleeves (not shown) that includes a plurality of modular housings 110a, 110b, 110c, 110d, or any number of sleeves that include a plurality of modular housings 110a, 110b, 110c, 110d.

In preferred embodiments, each of the plurality of modular housings 110a, 110b, 110c, 110d includes an internal cavity 150 with a ball valve 200 positioned therein. Therefore, the first modular housing 110a includes a first ball valve 200a, the second modular housing 110b includes a second ball valve 200b, the third modular housing 110c includes a third ball valve 200c, and the fourth modular housing 110d includes a fourth ball valve 200d. As will become more apparent upon further discussion herein, each of the ball valves 200a, 200b, 200c, 200d includes a plurality of apertures 220 that align with the plurality of inlet ports 106 and the plurality of outlet ports 108 to direct fluid throughout the vehicle. As further noted herein, all of the ball valves 200a, 200b, 200c, 200d are substantially similar to each other except for the placement of the plurality of apertures 220.

Referring to FIG. 1, the valve assembly 100 comprises an actuator 230 positioned on one side of the first or second sleeves 102, 104. Although the actuator 230 is illustrated on the left side of the valve assembly 100, it is contemplated that the actuator 230 may be positioned on either side of the control valve assembly 100. A DC motor (not shown) drives the actuator 230; however, any type of motor or device may be used as the actuator 230. For example, in some embodiments, a wax motor, a vacuum motor, a DC actuator, or the like may actuate the ball valves 200a, 200b, 200c, 200d. The actuator 230 rotates the ball valves 200a, 200b, 200c, 200d to align the ball valves 200a, 200b, 200c, 200d with the plurality of inlet ports 106 and the plurality of outlet ports 108. It is contemplated that the actuator 230 is connected to each of the ball valves 200a, 200b, 200c, 200d in any conventional manner. For example, a rod 232 may extend through each of the ball valves 200a, 200b, 200c, 200d and connect with the actuator 230. In alternative embodiments, all of the ball valves 200a, 200b, 200c, 200d may be attached to each other such that the actuator 230 only needs to turn one of the ball valves 200a, 200b, 200c, 200d to rotate all of the ball valves 200a, 200b, 200c, 200d. Further, in some embodiments, a valve assembly failsafe (not shown) may be coupled to the actuator 230, such that when provided with a signal indicative of valve control failure, the valve assembly failsafe can automatically rotate the control valve assembly 100 to a default position.

Referring to FIGS. 3-7, the first sleeve 102 of the control valve assembly 100 is shown separated from the second sleeve 104. As noted herein, the first sleeve 102 is substantially similar to the second sleeve 104 except for the number of outlet ports 108. Therefore, all components described with respect to the first sleeve 102 are included in the second sleeve 104. The first sleeve 102 includes a generally cylindrical body 250 that extends from a first end 252 to a second end 254. As discussed above, the first sleeve 102 includes the first modular housing 110a and the second modular housing 110b. In the present embodiment, the first modular housing 110a and the second modular housing 110b are separately sealed to each other to define the internal cavities 150 (see FIG. 18). As such, the first modular housing 110a includes a first internal cavity 150a and the second modular housing 110b includes a second internal cavity 150b. The plurality of inlet ports 106 and the plurality of outlet ports 108 extend outwardly from the first modular housing 110a and the second modular housing 110b.

As illustrated in FIGS. 3-7, each of the modular housings 110a, 110b includes one inlet port 106 and multiple outlet ports 108. In some embodiments, each of the modular housings 110a, 110b, 110c, 110d may include multiple inlet ports 106. Depending on the use of the control valve assembly 100, each of the modular housings 110a, 110b, 110c, 110d may include more inlet ports 106 than illustrated, or fewer inlet ports 106 than illustrated. For example, in some embodiments, each of the modular housings 110a, 110b, 110c, 110d may include one inlet port 106, or two inlet ports 106, or three inlet ports 106, or four inlet ports 106, or five inlet ports 106, or six inlet ports 106, or seven inlet ports 106, or eight inlet ports 106, or any number of inlet ports 106. Further, the control valve assembly 100 may include more outlet ports 108 than illustrated, or fewer outlet ports 108 than illustrated. For example, each of the modular housings 110a, 110b, 110c, 110d may include one outlet port 108, or two outlet ports 108, or three outlet ports 108, or four outlet ports 108, or five outlet ports 108, or six outlet ports 108, or seven outlet ports 108, or eight outlet ports 108, or any number of outlet ports 108. Further, the number of inlet ports 106 may be the same as the number of outlet ports 108 on each of the modular housings 110a, 110b, 110c, 110d. Alternatively, the number of inlet ports 106 may be different than the number of outlet ports 108 on each of the modular housings 110a, 110b, 110c, 110d. Further, the number of inlet ports 106 may be greater than the number of outlet ports 108. Alternatively, the number of outlet ports 108 may be greater than the number of inlet ports 106. As noted herein, all of the modular housings 110a, 110b, 110c, 110d are substantially similar to each other except for the number of the outlet ports 108.

Referring still to FIGS. 3-7, the first modular housing 110a includes the first ball valve 200a positioned within the first internal cavity 150a, and the second modular housing 110b includes the second ball valve 200b positioned within the second internal cavity 150b. The first and second modular housings 110a, 110b are separate from each other, such that the first ball valve 200a and the second ball valve 200b are independent from each other (see FIG. 18). Therefore, there is no fluid crosstalk between the first internal cavity 150a and the second internal cavity 150b.

Referring again to FIGS. 3-7, the first end 252 of the body 250 is adjacent to the first internal cavity 150a and the second end 254 of the body 250 is adjacent to the second internal cavity 150b. As noted herein, the first and second ends 252, 254 of the body 250 of the first sleeve 102 are illustrated as being open such that the first and second ball valves 200a, 200b can be illustrated. In preferred embodiments, the first and second ends 252, 254 of the body 250 are closed with a circular wall (not shown) to completely enclose the first and second internal cavities 150a, 150b. It is contemplated that any type of wall or closing may be placed on the first end 252 and second end 254 of the body 250 to close the first internal cavity 150a and the second internal cavity 150b.

Figure 6:
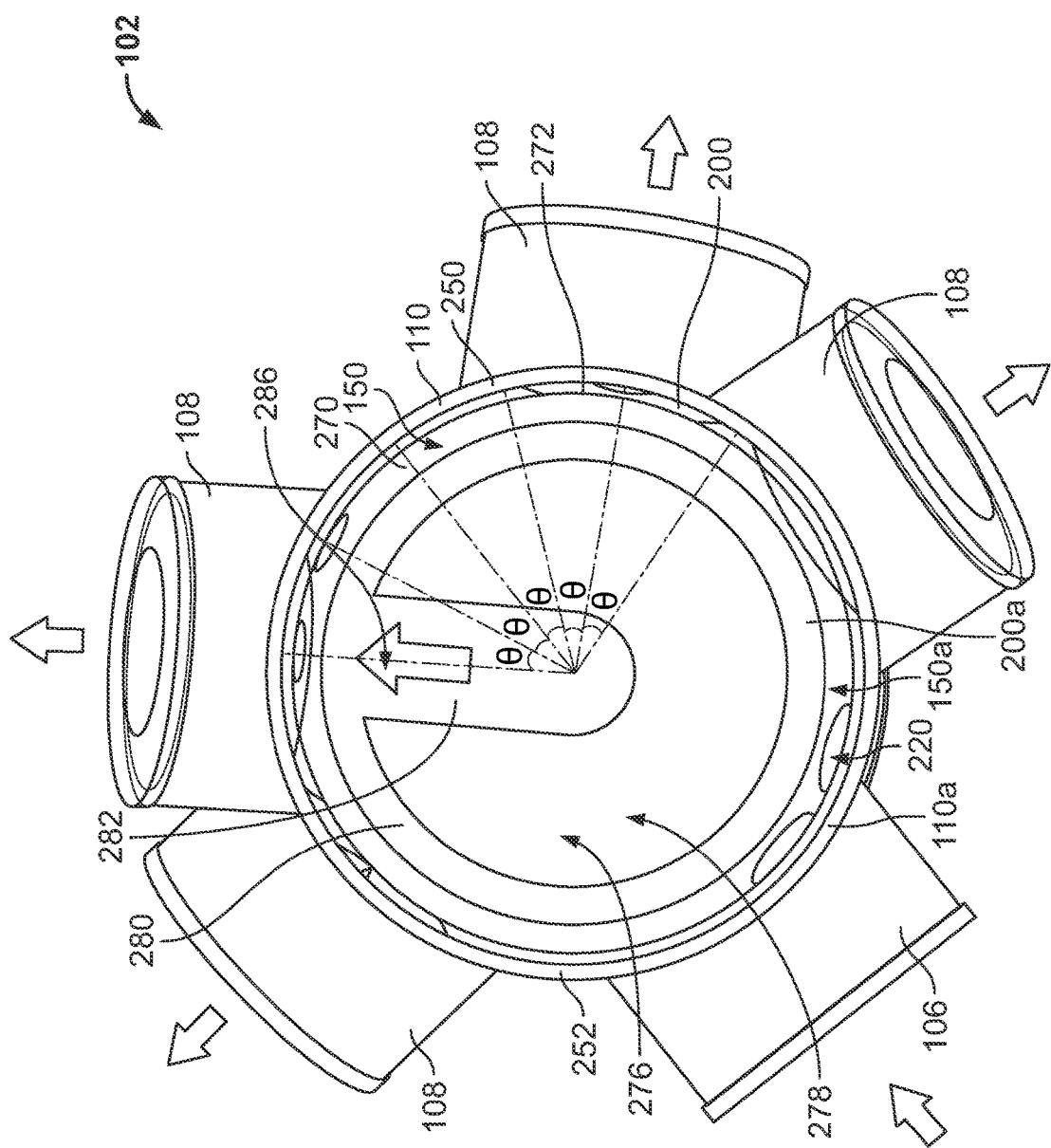
FIG. 6 is a front view of the first sleeve of FIG. 3.
Figure 7:
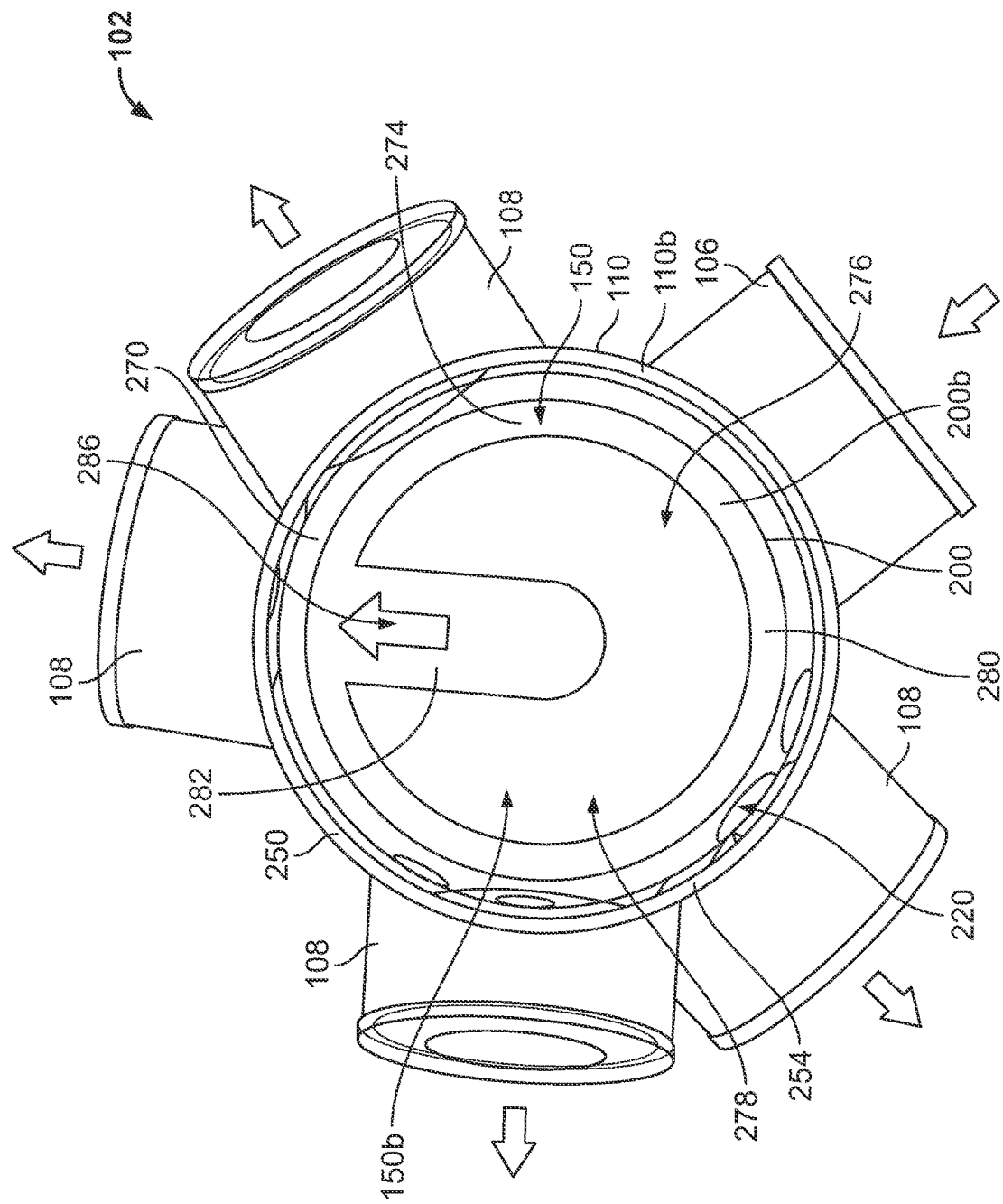
FIG. 7 is a rear view of the first sleeve of FIG. 3.

Referring to FIGS. 6 and 7, the first ball valve 200a and the second ball valve 200b are positioned within the first internal cavity 150a and the second internal cavity 150b, respectively. The first and second ball valves 200a, 200b are configured to rotate within the first and the second internal cavities 150a, 150b, respectively, to align with the plurality of inlet and outlet ports 106, 108. Depending on the rotation of the first and second ball valves 200a, 200b, fluid is directed from the inlet ports 106 to specific outlet ports 108 on the first sleeve 102. In preferred embodiments, all of the plurality of outlet ports 108 in the control valve assembly 100 include a sealing system or sealing pack (not shown) between the ball valves 200a, 200b, 200c, 200d and the outlet port 108. In some embodiments, the sealing system or sealing pack used is of the type disclosed in U.S. Pat. Nos. 7,963,455 and 9,951,878, which are incorporated herein by reference in their entirety. As noted herein, the inlet ports 106 do not comprise any type of sealing system. Therefore, fluid is constantly allowed to flow from the inlet ports 106 into the modular housings 110. However, as will become more apparent upon further discussion herein, depending on the rotational position of the ball valves 200a, 200b, 200c, 200d, the fluid will leave the modular housings 110a, 110b, 110c, 110d through specific outlet ports 108.

Figure 8:
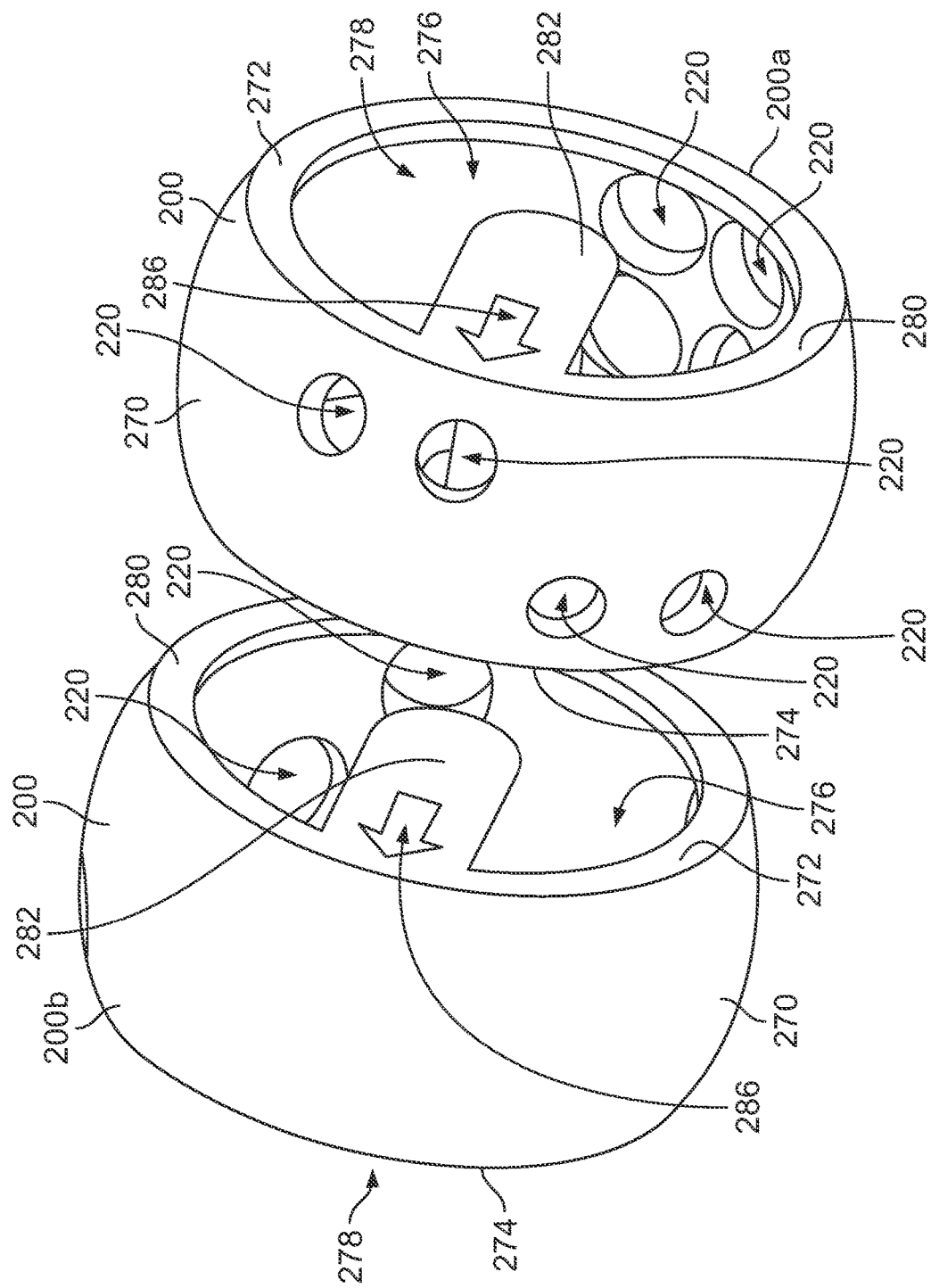
FIG. 8 is an isometric view of a first ball valve and a second ball valve with the first sleeve of FIG. 3 removed.
Figure 9:
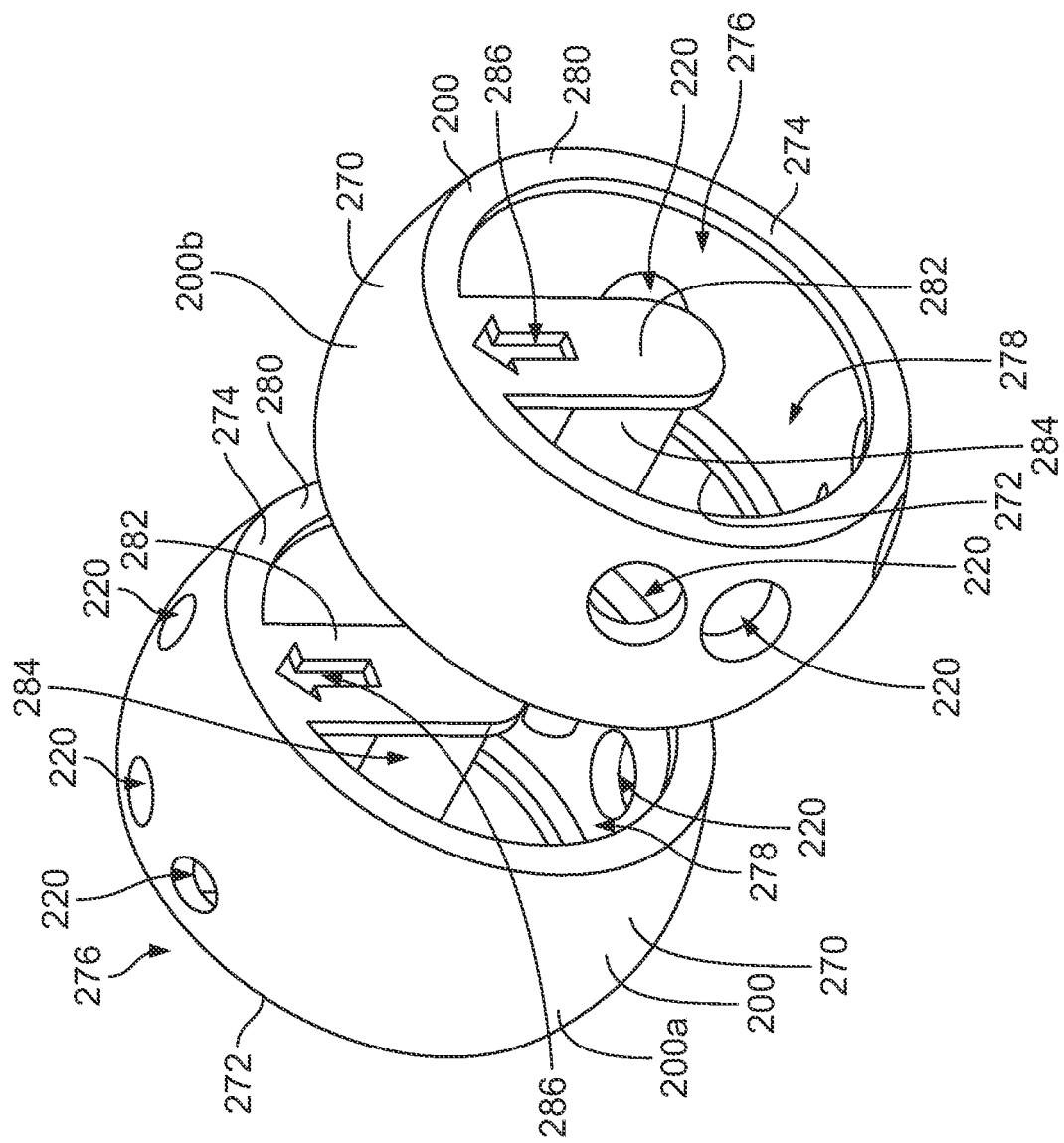
FIG. 9 is another isometric view of the first ball valve and the second ball valve of FIG. 8.
Figure 10:
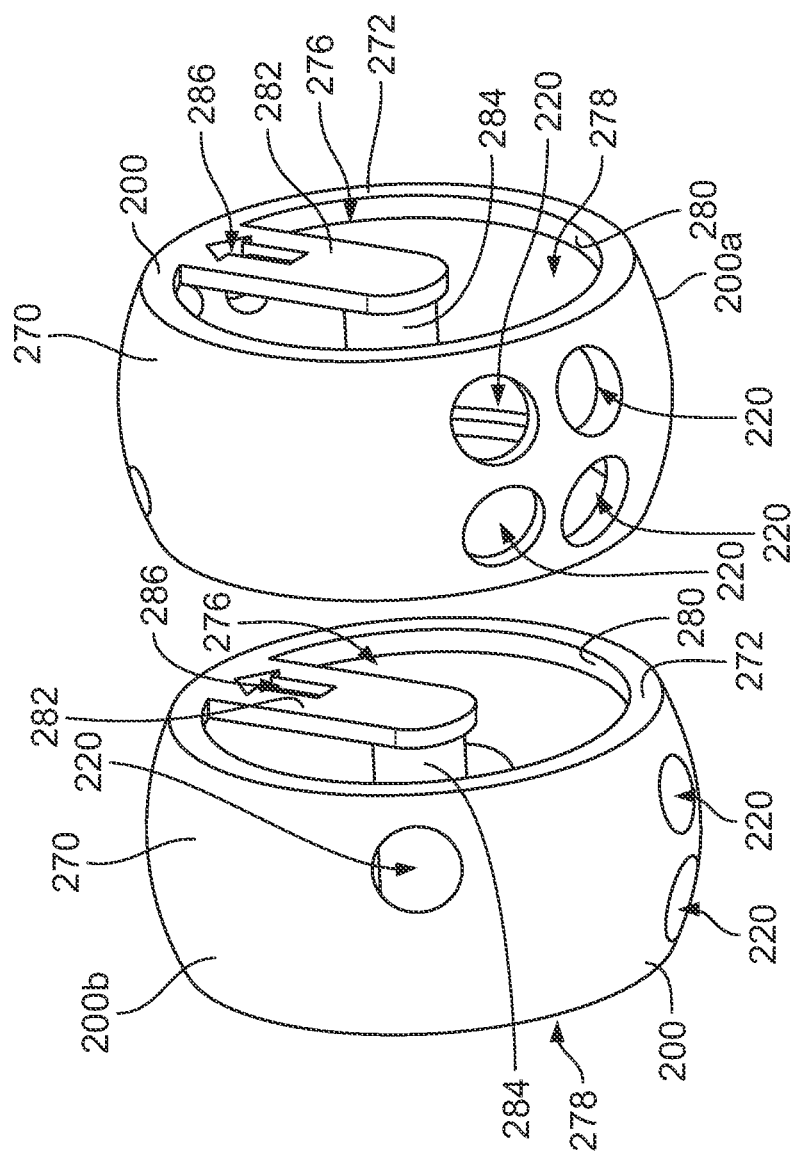
FIG. 10 is yet another isometric view of the first ball valve and the second ball valve of FIG. 8.

Turning to FIGS. 8-10, the first ball valve 200a and the second ball valve 200b are shown removed from the first modular housing 110a and the second modular housing 110b. As discussed above and as illustrated in FIG. 8, the first ball valve 200a is substantially similar to the second ball valve 200b except for the placement of the plurality of apertures 220. As noted herein, all components described with respect to the first ball valve 200a are included in all of the ball valves 200a, 200b, 200c, 200d.

Figure 11:
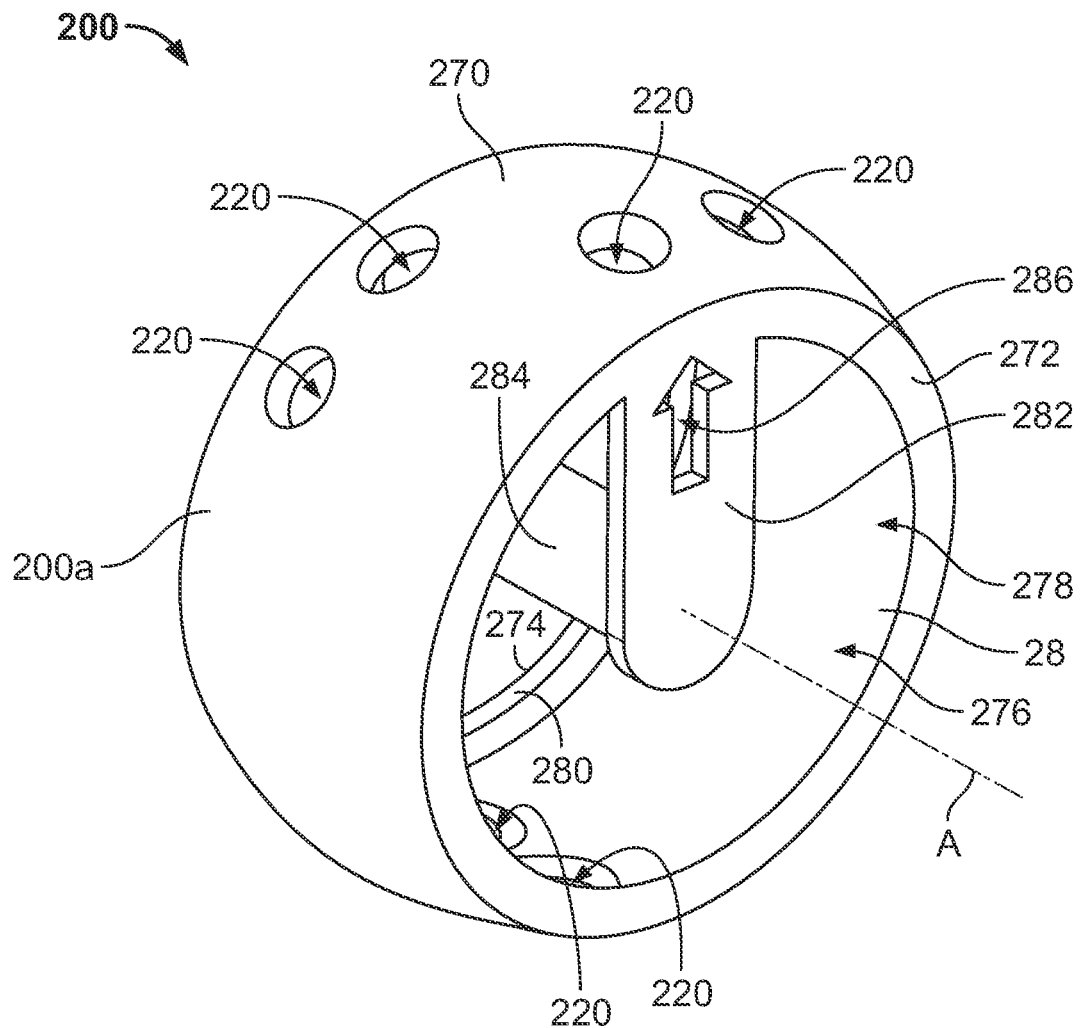
FIG. 11 is an isometric view of the first ball valve of FIG. 8 with the second ball valve removed.
Figure 12:
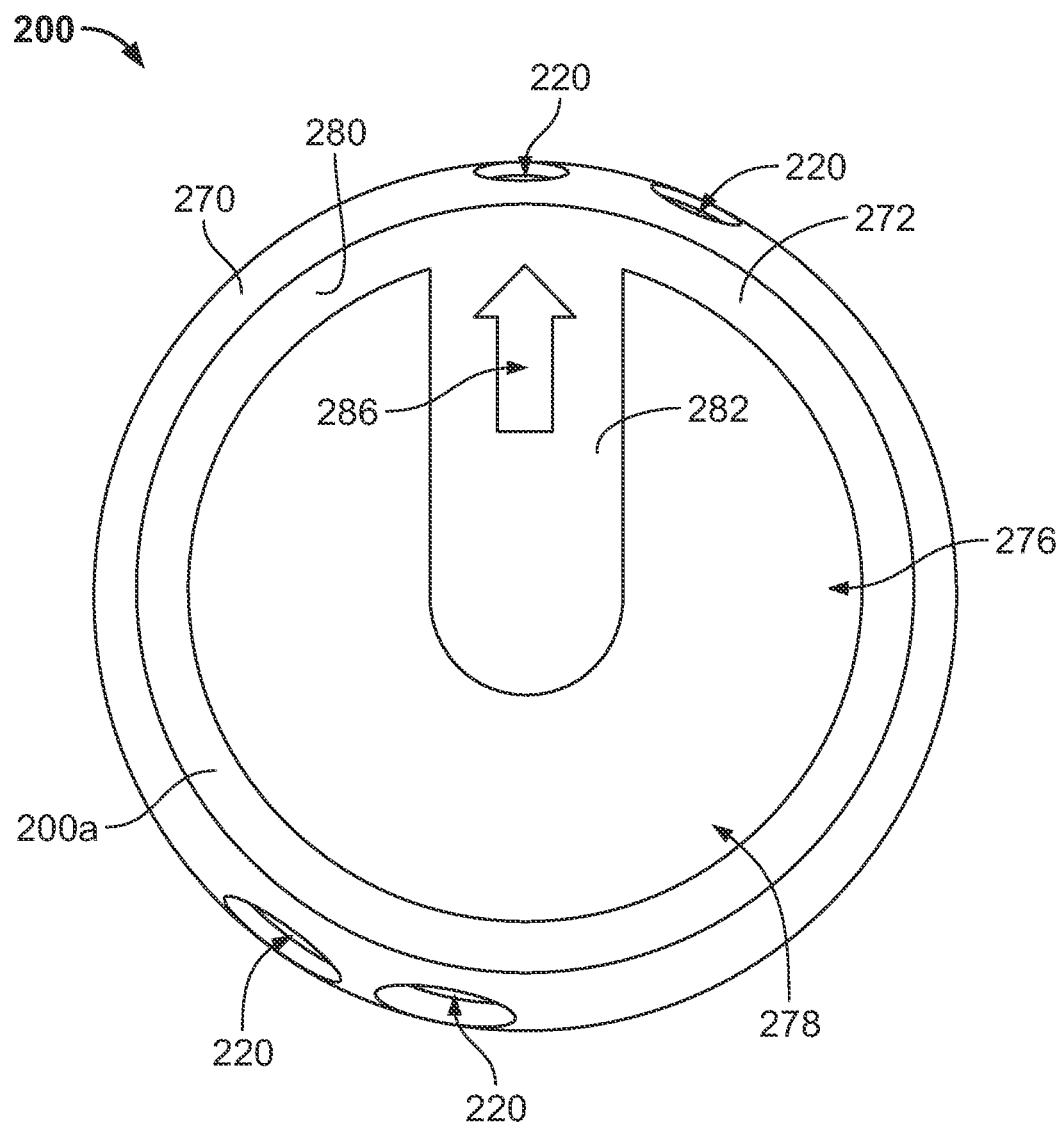
FIG. 12 is a front view of the first ball valve of FIG. 11.
Figure 13:
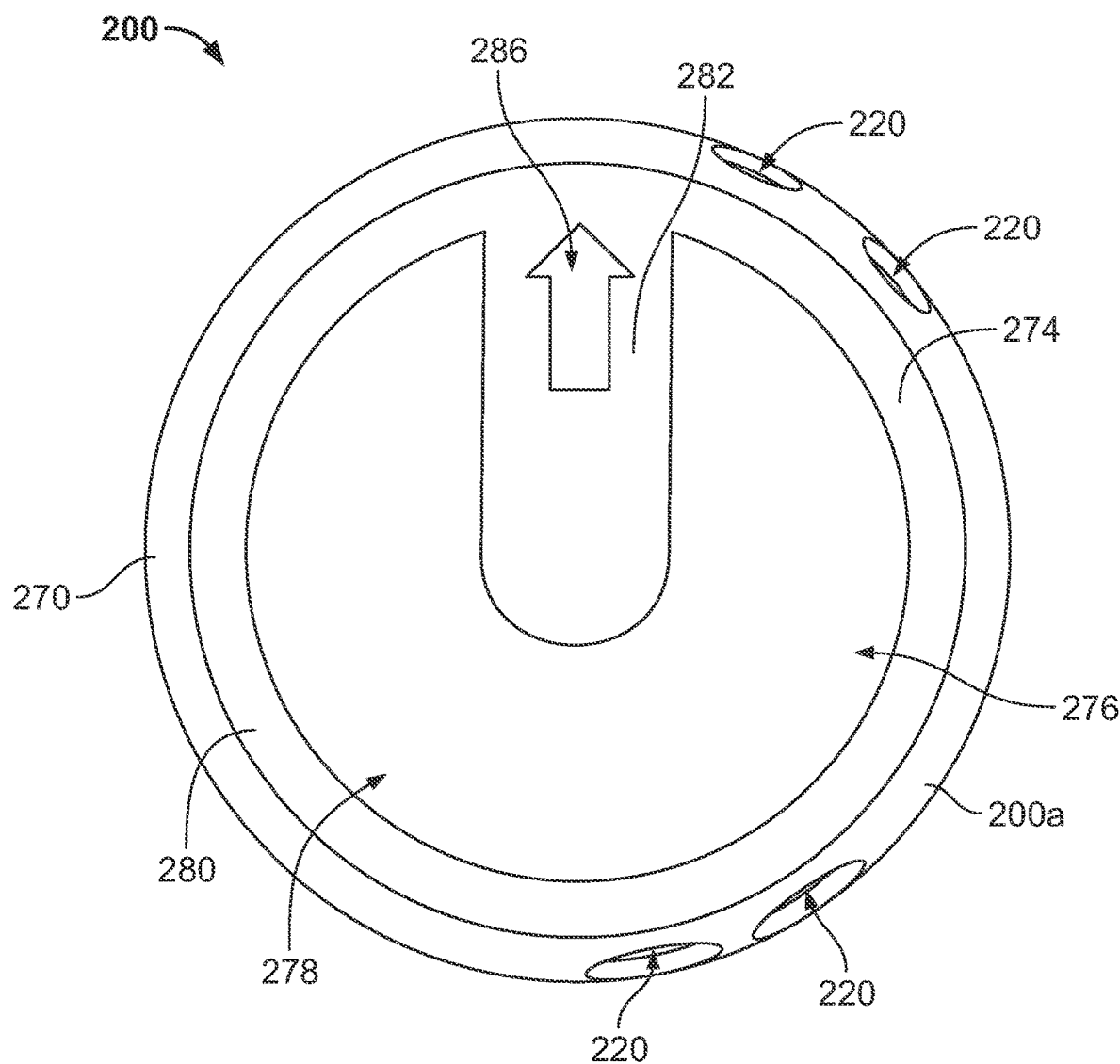
FIG. 13 is a rear view of the first ball valve of FIG. 11.
Figure 14:
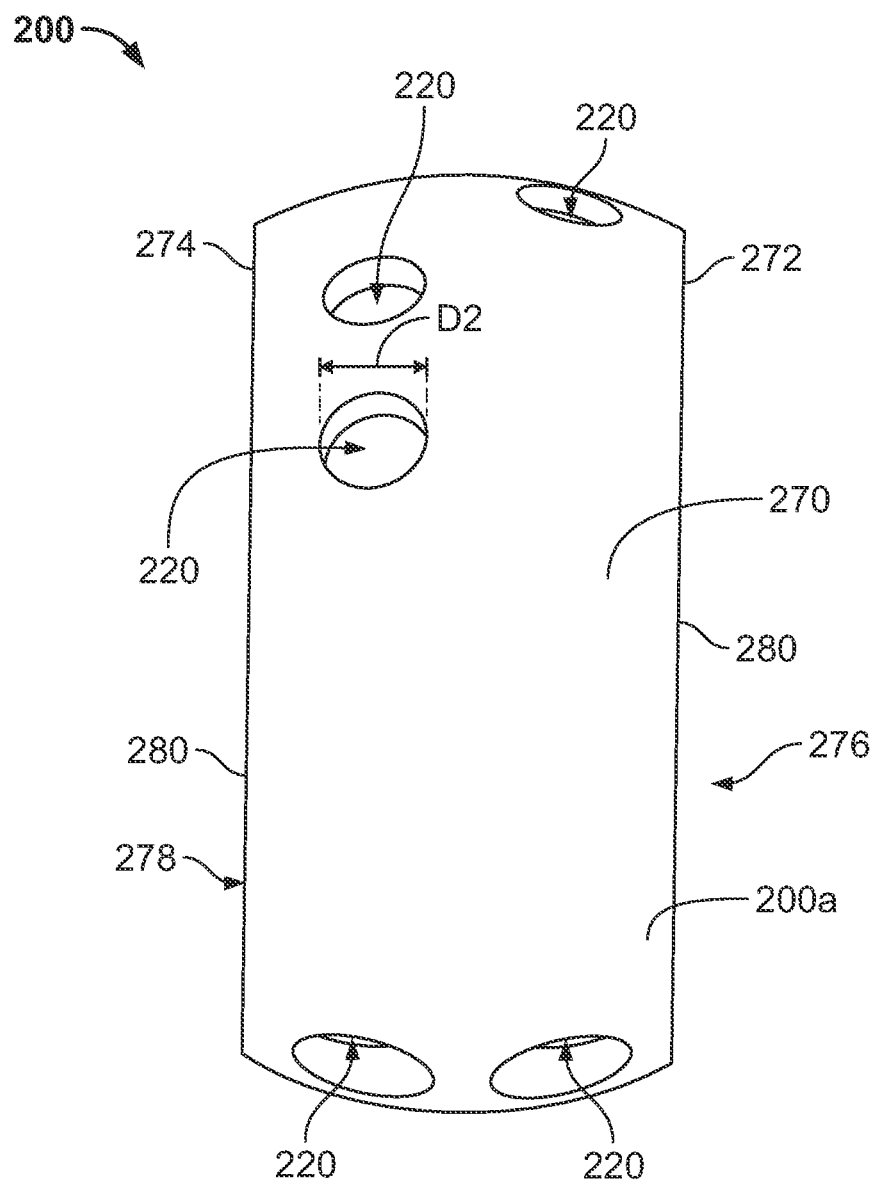
FIG. 14 is a side view of the first ball valve of FIG. 11.
Figure 15:
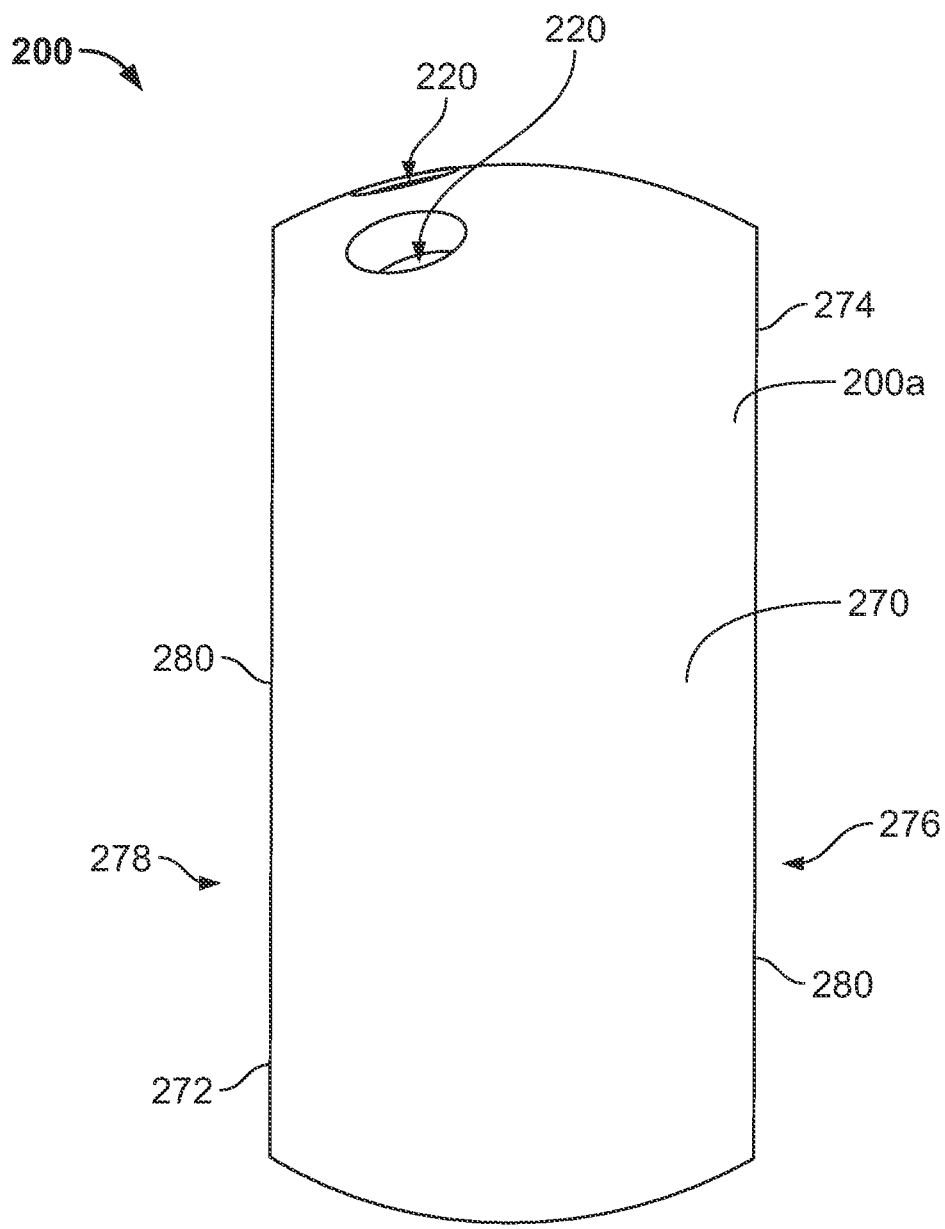
FIG. 15 is another side view of the first ball valve of FIG. 11.

FIGS. 11-17 depict the first ball valve 200a. As illustrated in FIGS. 11 and 12, the first ball valve 200a defines a generally spherical-shell or ring shape with a rounded wall 280 that extends from a first end 272 to a second end 274 of the first ball valve 200a. The first ball valve 200a includes a hole 276 that extends therethrough. The hole 276 creates an internal chamber 278 that is open on the first end 272 and the second end 274 of the first ball valve 200a. Further, a flange 280 extends circumferentially around the first ball valve 200a from the rounded wall 270 on both the first and second ends 272, 274 of the first ball valve 200a. As illustrated in FIGS. 11-13, the first ball valve 200a comprises arms 282 that extend radially inward from the flange 280 on the first end 272 and the second end 274. The arms 282 are connected to each other by a cylindrical rod 284 that extends through a center axis A of the first ball valve 200a (see FIG. 11). In some embodiments, the cylindrical rod 284 may be a component of the rod 232 that extends through the ball valves 200a, 200b, 200c, 200d from the actuator 230 (see FIG. 1). In other embodiments, the rod 232 or an adjacent ball drive feature may be inserted into or slid onto the cylindrical rod 284 to rotate the first ball valve 200a. In such an embodiment, an outer diameter of the cylindrical rod 284 and/or an inner diameter of the rod 232 or the ball drive feature may comprise interlocking geometry. It is contemplated that the ball valves 200a, 200b, 200c, 200d may be rotated by the actuator 230 in any conventional manner. In preferred embodiments, the first ball valve 200a rotates about the cylindrical rod 284. Additionally, each of the arms 282 may include an arrow cutout 286 that extends therethrough to indicate the position of the first ball valve 200a. In some embodiments, the arms 282 may not include the arrow cutout 286 or any type of cutout therein. In preferred embodiments, the first ball valve 200a is molded of plastic, however, the ball valves 200a, 200b, 200c, 200d may be formed in any conventional style. In alternative embodiments, the ball valves 200a, 200b, 200c, 200d can be any size such that the ball valves 200a, 200b, 200c, 200d properly fit within the modular housings 110a, 110b, 110c, 110d.

Referring to FIGS. 11 and 14-18, the first ball valve 200a comprises the plurality of apertures 220 that extend through the rounded wall 270 into the internal chamber 278 of the first ball valve 200a. The apertures 220 are spaced out at different radial angles on the rounded wall 270 of the first ball valve 200a to provide a multi-angular seal. Some of the plurality of apertures 220 are positioned next to each other in a pattern (see FIG. 17) while others may be diagonally spaced apart (see FIG. 16).

Figure 16:
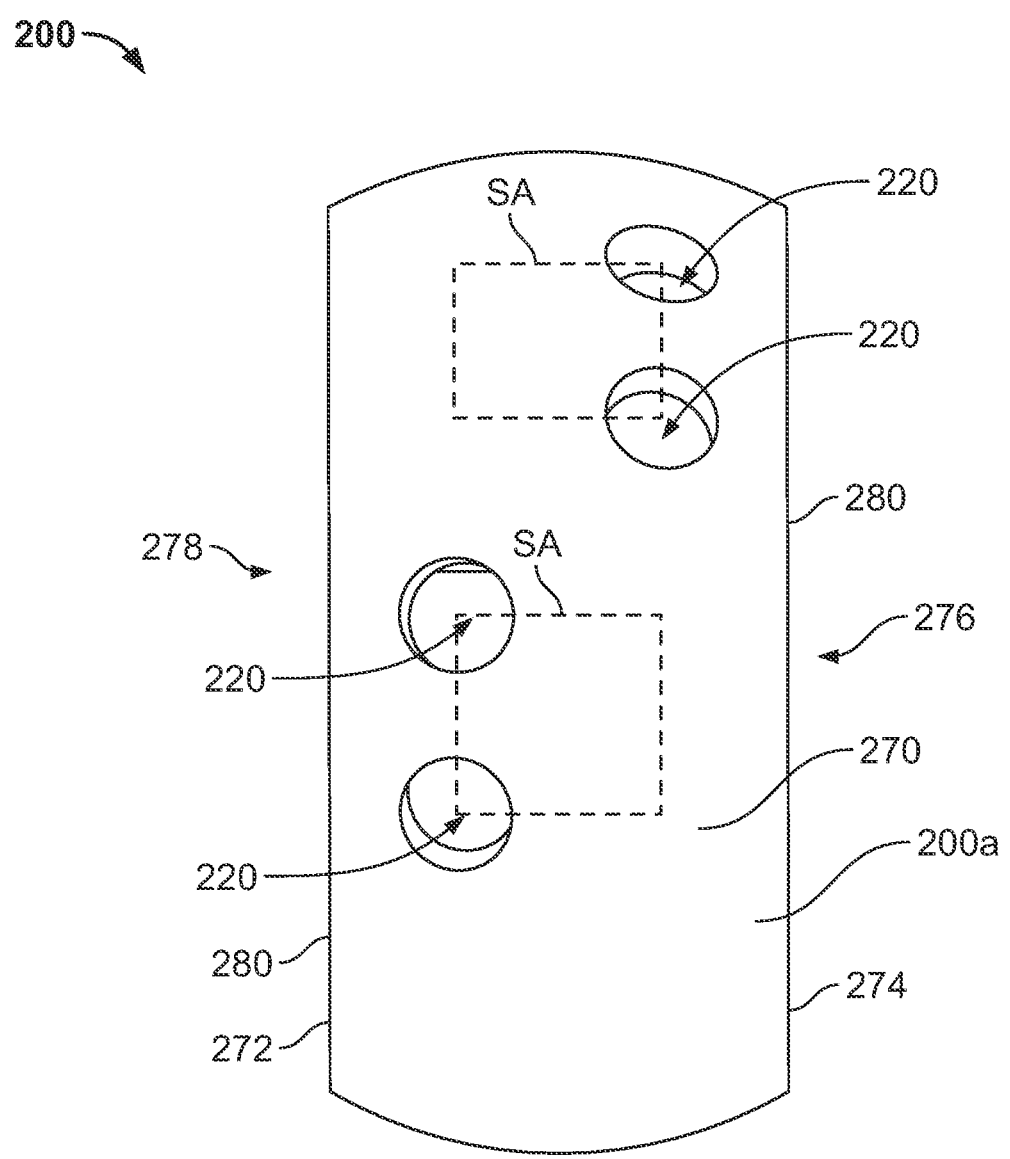
FIG. 16 is a top view of the first ball valve of FIG. 11.
Figure 17:
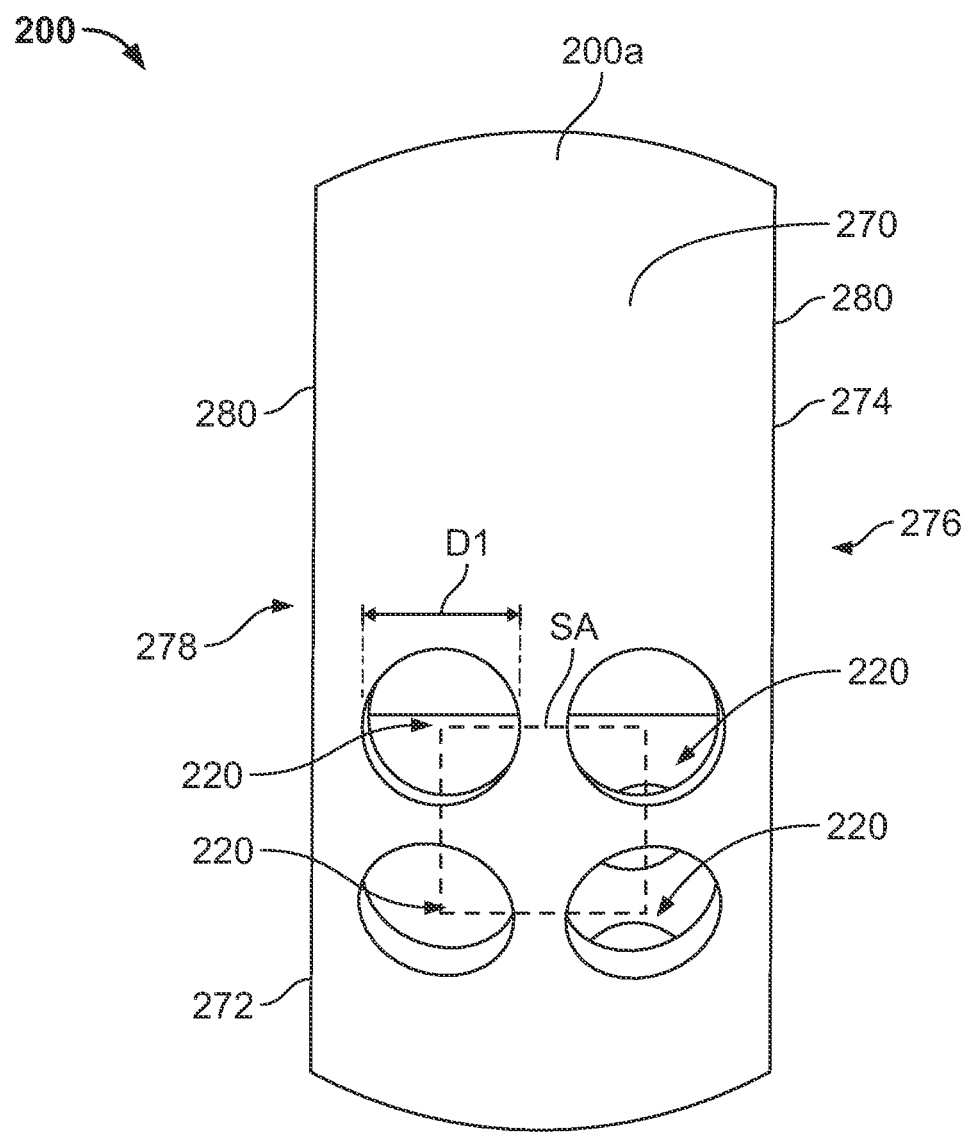
FIG. 17 is a bottom view of the first ball valve of FIG. 11.
Figure 18:
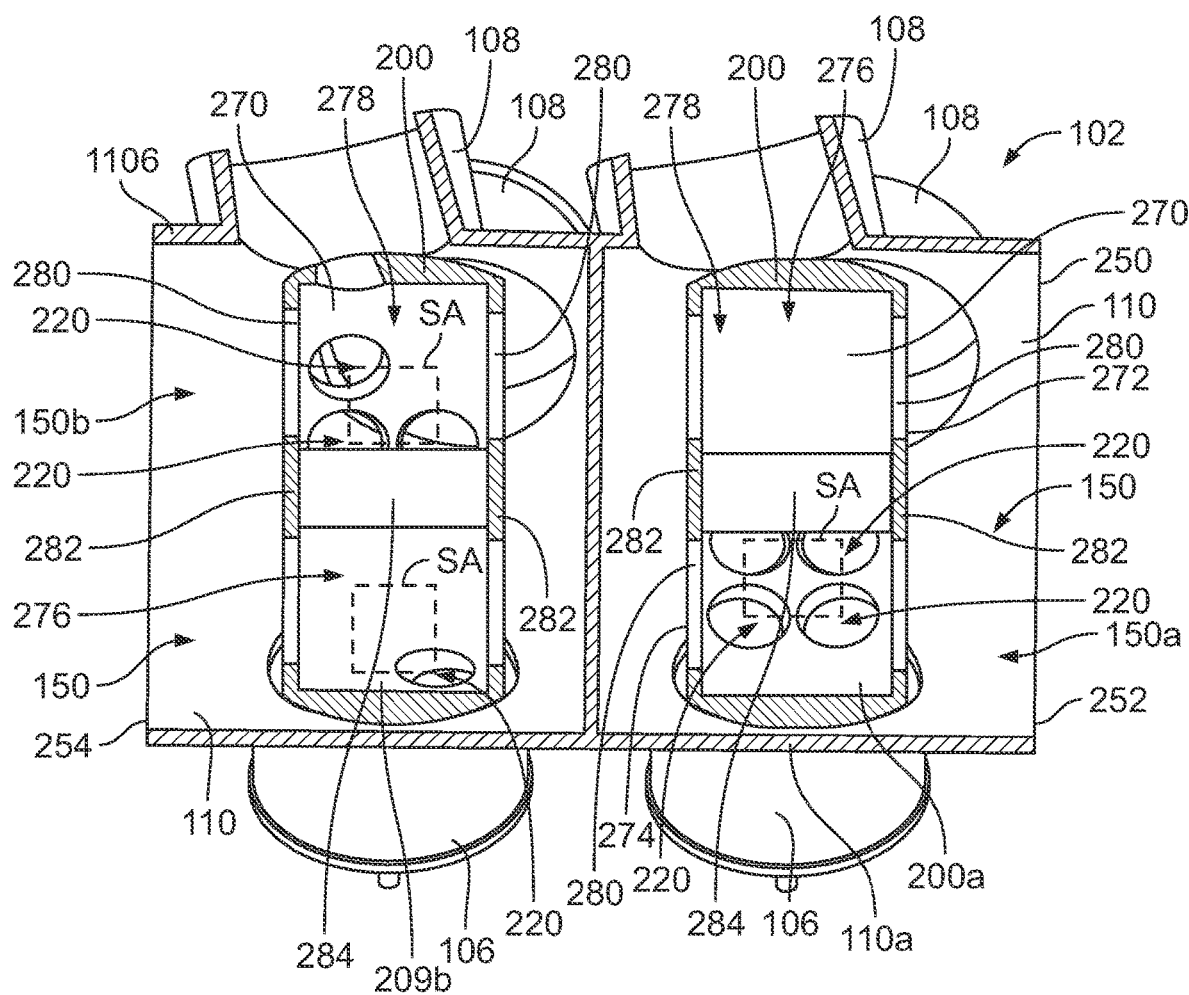
FIG. 18 is a cross sectional view of the first sleeve of FIG. 3.

Referring to FIGS. 16-18, the plurality of apertures 220 may define a plurality of generally square arrays or square arrays or groups SA. The square arrays SA may contain four array positions. The square arrays SA may contain an aperture 220 in one of the four array positions (see FIG. 18), or two of the four array positions (see FIG. 16), or three of the four array positions (see FIG. 18), or all four of the four array positions (see FIG. 17). Further, the plurality of apertures 220 may define one square array SA, or two square arrays SA, or three square arrays SA, or four square arrays SA, or five square arrays SA, or six square arrays SA, or any number of square arrays SA. As noted herein, the plurality of apertures 220 may be otherwise positioned in any pattern or configuration on the first ball valve 200a. Additionally, the first ball valve 200a may include any number of apertures 220 on the rounded wall 270. Further, the apertures 220 may be any size. In other embodiments, the plurality of apertures 220 may vary in size around the rounded wall 270. For example, one aperture 220 may include a diameter D1 (see FIG. 17) while another aperture 220 may include a diameter D2 (see FIG. 14).

As discussed above, each of the plurality of outlet ports 108 includes a sealing system (not shown) between the outlet port 108 and the first ball valve 200a. As such, the rounded wall 270 of the first ball valve 200a seals against the sealing system of the outlet port 108 (see FIG. 6). Therefore, the only way for fluid to leave the internal cavity 150a of the modular housing 110a is through one of the plurality of apertures 220 on the ball valves 200a when the aperture 220 is aligned with one of the plurality of outlet ports 108 (see FIG. 18). Thus, the plurality of apertures 220 on the first ball valve 200a provide a multi-angular seal on the first ball valve 200a.

Referring to FIG. 18, a cross sectional view of the first sleeve 102 is shown. As illustrated in FIG. 18, the ball valves 200a, 200b are placed in a first rotational position. In this position, the plurality of apertures 220 are aligned with specific outlet ports 108 such that the fluid may flow from the inlet ports 106 through the ball valves 200a, 200b and out one of the plurality of outlet ports 108. Additionally, in this position, some of the outlet ports 108 are blocked from receiving fluid by the ball valves 200a, 200b. Once the ball valves 200a, 200b rotate to a second rotational position, different outlet ports 108 will align with the apertures 220 on the ball valves 200a, 200b such that fluid will flow through a different set of outlet ports 108 than the first rotational position.

Referring again to FIG. 6, the ball valves 200a, 200b may be configured to comprise numerous rotational positions that each specifically direct fluid to specific outlet ports 108 in each discrete position. For example, the ball valves 200a, 200b may be configured to rotate between two rotational positions, or three rotational positions, or four rotational positions, or five rotational positions, or six rotational positions, or seven rotational positions, or eight rotational positions, or nine rotational positions, or ten rotational positions, or any number of rotational positions. Further, each of the rotational positions may be unevenly spaced apart. Alternatively, each of the rotational positions may be evenly spaced apart by an angle of rotation $\Theta$. In some embodiments, the angle of rotation $\Theta$ may be between about 10 degrees and about 40 degrees, or between about 15 degrees and about 35 degrees, or between about 20 degrees and about 30 degrees.

In some embodiments, the angle of rotation $\Theta$ may be about 10 degrees, or about 15 degrees, or about 20 degrees, or about 25 degrees, or about 30 degrees, or about 35 degrees, or about 40 degrees, or any other number of degrees. In a preferred embodiment, and as illustrated in FIG. 6, the ball valves 200a, 200b are configured to rotate between six rotational positions that are evenly spaced apart by an angle of rotation $\Theta$ of about 24 degrees. As noted herein, the first ball valve 200a comprises a different configuration of apertures 220 than the second ball valve 200b. As such, each ball valve 200a, 200b operates independently and can open and close different outlet ports 108. As further noted herein, each rotational position of the ball valves 200a, 200b may open different or the same outlet ports 108 as a previous rotational position.

Referring to FIGS. 1, 2, and 18, the plurality of apertures 220 are designed to align with the plurality of inlet ports 106 and outlet ports 108 on the modular housing 110 in certain rotational positions to direct fluid throughout the vehicle. Therefore, depending on the rotational position of the ball valves 200a, 200b, 200c, 200d, portions of or all of at least one (and possibly all) of the plurality of apertures 220 will align with some of the plurality of outlet ports 108 to direct flow accordingly. As such, the plurality of apertures 220 of the ball valves 200a, 200b, 200c, 200d are positioned specifically to align with certain outlet ports 108 in particular rotational positions to provide a multi-angular seal with the plurality of outlet ports 108. Therefore, depending on the number of outlet ports 108 and the number of rotational positions needed, the ball valves 200a, 200b, 200c, 200d may include any type, configuration, and/or number of apertures 220 such that the predetermined conditions may be met. Therefore, the ball valves 200a, 200b, 200c, 200d can be customizable to fit the designed number of outlet ports 108 needed for the vehicle. As such, the plurality of apertures 220 on the ball valves 200a, 200b, 200c, 200d allow a single spherical ball valve to include more flow control than conventional ball valve designs. In alternative embodiments, the control valve assembly 100 can include more or less ball valves 200a, 200b, 200c, 200d than illustrated.

Referring back to FIGS. 1 and 2, each modular housing 110a, 110b, 110c, 110d can include one of the ball valves 200a, 200b, 200c, 200d described above. Therefore, depending on the rotational position of the ball valves 200a, 200b, 200c, 200d, each ball valve 200a, 200b, 200c, 200d can direct fluid out of each modular housing 110a, 110b, 110c, 110d through different outlet ports 108. Thus, the capacity of the control valve assembly 100 is increased such that multiple fluid control circuits (e.g., transition oil heater, cabin heating system, battery cool, electronic heat control, etc.) can be connected with the single control valve assembly 100. This provides for an increase in the cooling/heating mode capacity over conventional ball valve designs. In particular, the control valve assembly 100 includes more fluid circuitry options while still being single driven by the actuator 230.

Furthermore, the control valve assembly 100 can increase the efficiency of the vehicle by allowing multiple fluid control circuits to be connected. Therefore, the single control valve assembly 100 can pull waste heat from other portions of the vehicle and direct it to specific areas where it is needed. For example, heat from the battery can be redirected to heat the cabin. Additionally, coolant from one area of the vehicle can be redirected to lower the battery temperature, therefore increasing the range of an electric vehicle, for example.

While various spatial and directional terms, such as top, bottom, lower, mid, lateral, horizontal, vertical, front, rear, and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain how to practice the disclosure and will enable others skilled in the art to utilize the disclosure. The claims are to be construed to include alternative embodiments to the extent permitted by the prior art.

As noted previously, it will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

We claim:

1. A coolant control regulator assembly, comprising:
   a plurality of modular housings, wherein each of the modular housings comprises an internal cavity, at least one inlet port, and at least one outlet port;
   an actuator operatively connected to at least one of the plurality of modular housings; and
   a plurality of ball valves, wherein each of the internal cavities includes one of the plurality of ball valves positioned therein,
   wherein at least one of the plurality of ball valves comprises a plurality of apertures that defines a square array and are configured to align with the at least one inlet port and the at least one outlet port in certain rotational positions.

2. The coolant control regulator assembly of claim 1, wherein the at least one inlet port comprises a plurality of inlet ports.

3. The coolant control regulator assembly of claim 1, wherein the at least one outlet port comprises a plurality of outlet ports.

4. The coolant control regulator assembly of claim 1, wherein the number of inlet ports is different than the number of outlet ports.

5. The coolant control regulator assembly of claim 1, wherein the number of outlet ports is greater than the number of inlet ports.

6. The coolant control regulator assembly of claim 1, further comprising a rod that extends through each of the plurality of ball valves.

7. The coolant control regulator assembly of claim 6, wherein the rod is configured to rotate each of the plurality of ball valves.

8. The coolant control regulator assembly of claim 1, wherein the actuator is configured to rotate at least one of the plurality of ball valves.

9. The coolant control regulator assembly of claim 8, wherein when the actuator rotates one of the plurality of ball valves, the actuator rotates all of the plurality of ball valves.

10. The coolant control regulator system of claim 1, wherein the internal cavities of each of the modular housings are independent, such that the internal cavities are not in fluid communication with each other.

11. The coolant control regulator system of claim 1, wherein the plurality of ball valves each comprise more than two rotational positions to allow fluid to pass through the ball valves.

12. The coolant control regulator system of claim 11, wherein the rotational positions are spaced apart from each other at an angle of between about 10 degrees and about 40 degrees.

13. The coolant control regulator system of claim 1, wherein at least one of the plurality of ball valves is ring shaped and defines a rounded wall, a plurality of arms extend radially inward from the rounded wall.

14. A coolant control regulator assembly, comprising:
   a plurality of modular housings, wherein each of the modular housings comprises an internal cavity, at least one inlet port, and at least one outlet port; and
   a plurality of ball valves, wherein each of the internal cavities includes one of the plurality of ball valves positioned therein,
   wherein at least one of the plurality of ball valves comprises a plurality of apertures, at least one of the plurality of apertures disposed adjacent to at least one corner of a square array, the at least one of the plurality of apertures configured to align with the at least one inlet port and the at least one outlet port in certain rotational positions, and
   wherein at least one of the plurality of ball valves comprises more than two rotational positions to allow fluid to pass through the ball valve.

15. The coolant control regulator assembly of claim 14, further comprising an actuator operatively connected to at least one of the plurality of modular housings.

16. The coolant control regulator assembly of claim 15, wherein the actuator is configured to rotate at least one of the plurality of ball valves.

17. The coolant control regulator system of claim 14, wherein the rotational positions are spaced apart from each other at an angle of between about 10 degrees and about 40 degrees.

18. A ball valve for a coolant control regulator assembly, comprising:
   a body that is ring-shaped and defines a rounded wall, the body extending from a first lateral end to a second lateral end;

a plurality of arms including a plurality of free ends that extend radially inward from the rounded wall toward a central axis; and a rod that connects the plurality of arms together, wherein the rounded wall comprises a plurality of apertures therethrough.

19. The ball valve of claim 18, wherein the rod extends through the central axis of the body.

20. The ball valve of claim 18, further comprising a flange that extends circumferentially inward from the rounded wall on both the first lateral end and the second lateral end, and wherein the plurality of arms extend radially inward from the flange.

\* \* \* \* \*